United States Patent [19]
Hoshino

[11] Patent Number: 5,062,606
[45] Date of Patent: Nov. 5, 1991

[54] ADJUSTABLY TILTABLE TRIPOD STAND

[75] Inventor: Yoshihiro Hoshino, Nagoya, Japan

[73] Assignee: Hoshino Gakki Co. Ltd., Japan

[21] Appl. No.: 541,206

[22] Filed: Jun. 4, 1990

Related U.S. Application Data

[63] Continuation of Ser. No. 339,009, Apr. 17, 1989, abandoned.

[30] Foreign Application Priority Data

Aug. 29, 1988 [JP] Japan .................. 63-113189

[51] Int. Cl.⁵ .............................................. F16M 11/00
[52] U.S. Cl. ...................................... 248/171; 248/169
[58] Field of Search ............... 248/166, 168, 170, 171, 248/169, 185, 188.6, 188.8; 211/203

[56] References Cited

U.S. PATENT DOCUMENTS

| | | | |
|---|---|---|---|
| 726,455 | 4/1903 | Pepper | 248/171 X |
| 1,152,071 | 8/1915 | Burnell | 248/171 |
| 1,175,352 | 3/1916 | Hand | 248/171 |
| 1,795,747 | 3/1931 | Viken | 248/171 X |
| 2,153,821 | 4/1931 | Walberg | 248/169 X |
| 2,282,285 | 5/1942 | Olson | 248/169 |
| 2,845,244 | 7/1958 | Prokop | 211/203 X |
| 2,984,444 | 5/1961 | Lewis | 248/166 |
| 3,282,530 | 11/1966 | Rash | 248/170 |
| 3,304,045 | 2/1967 | Bethoney | 248/170 X |
| 3,697,031 | 10/1972 | Glickman et al. | 248/171 |

FOREIGN PATENT DOCUMENTS 0320777 of 1928 United Kingdom ................ 248/171
616686 1/1949 United Kingdom ................ 248/166

*Primary Examiner*—David L. Talbott
*Assistant Examiner*—Daniel J. Hulseberg
*Attorney, Agent, or Firm*—Ostrolenk, Faber, Gerb & Soffen

[57] ABSTRACT

A tripod stand for supporting a musical instrument or other object, wherein a main post is provided with an upper slide member to which the upper ends of the three legs of the tripod are hingedly connected. A respective articulated arm connects each leg with the lower portion of the main post. Movement of the slide member up and down causes selective inward and outward movement of the legs. One of the articulated arms is adjustable in length and is typically adjusted longer than the other nonadjustable articulated arms when it is desired to tilt the stand toward the leg attached at the one articulated arm. Such adjustability is obtained by making the one articulated arm telescopable in length or by providing that arm with an elongate slot that is slidable along the journal connection of that arm to the respective leg and is selectively positionable at a desired length for that arm. The downward movement of the slide member causes that leg attached to the longer arm to move outward further from the main post, making the bottom ends of the legs move from defining an equilateral triangle to defining an isosceles triangle and thereby tilting the main post. Greater stability can be achieved by increasing the angle between the two legs that are opposite the leg having the one adjustably longer articulated arm.

26 Claims, 4 Drawing Sheets

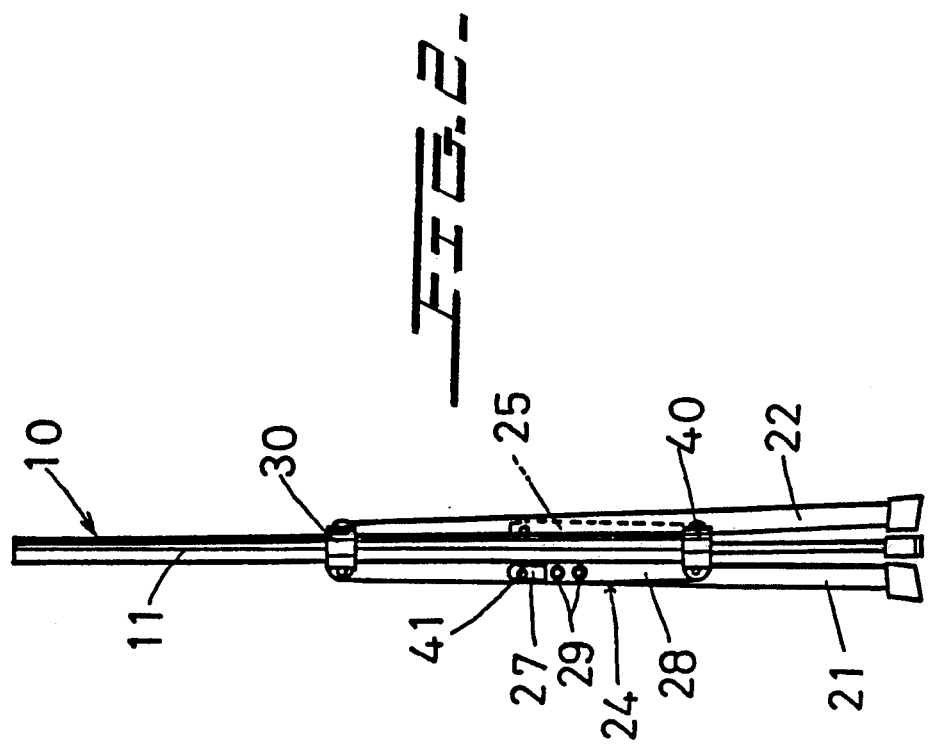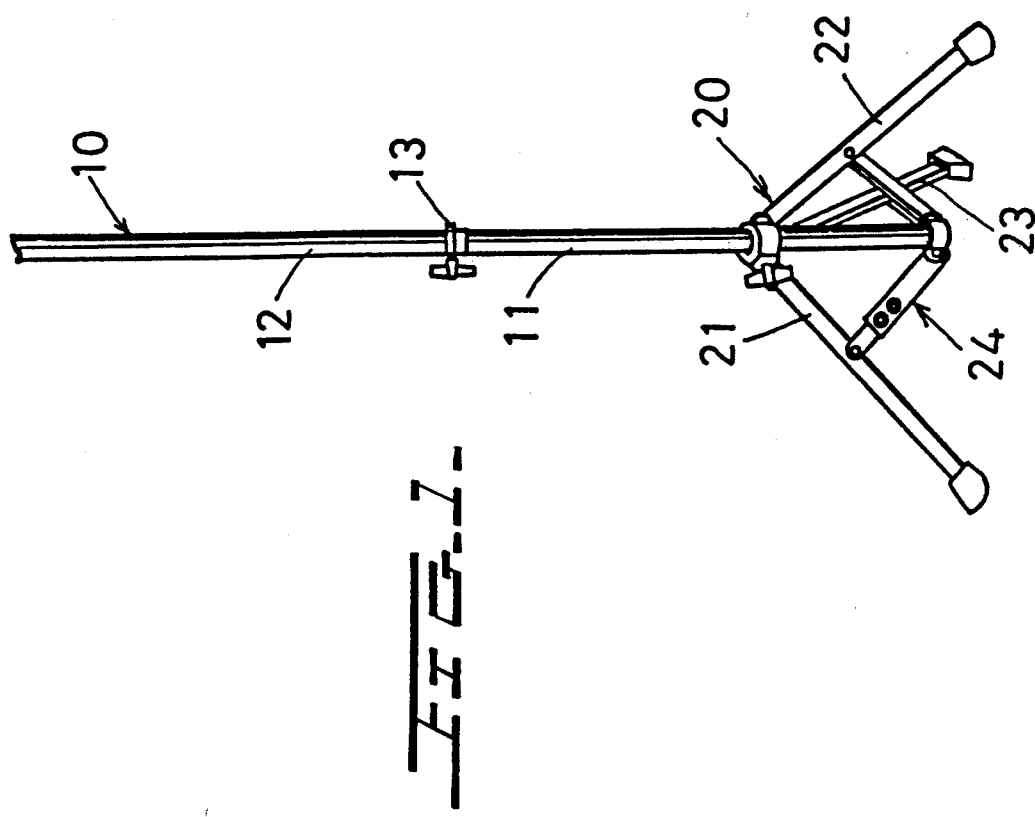

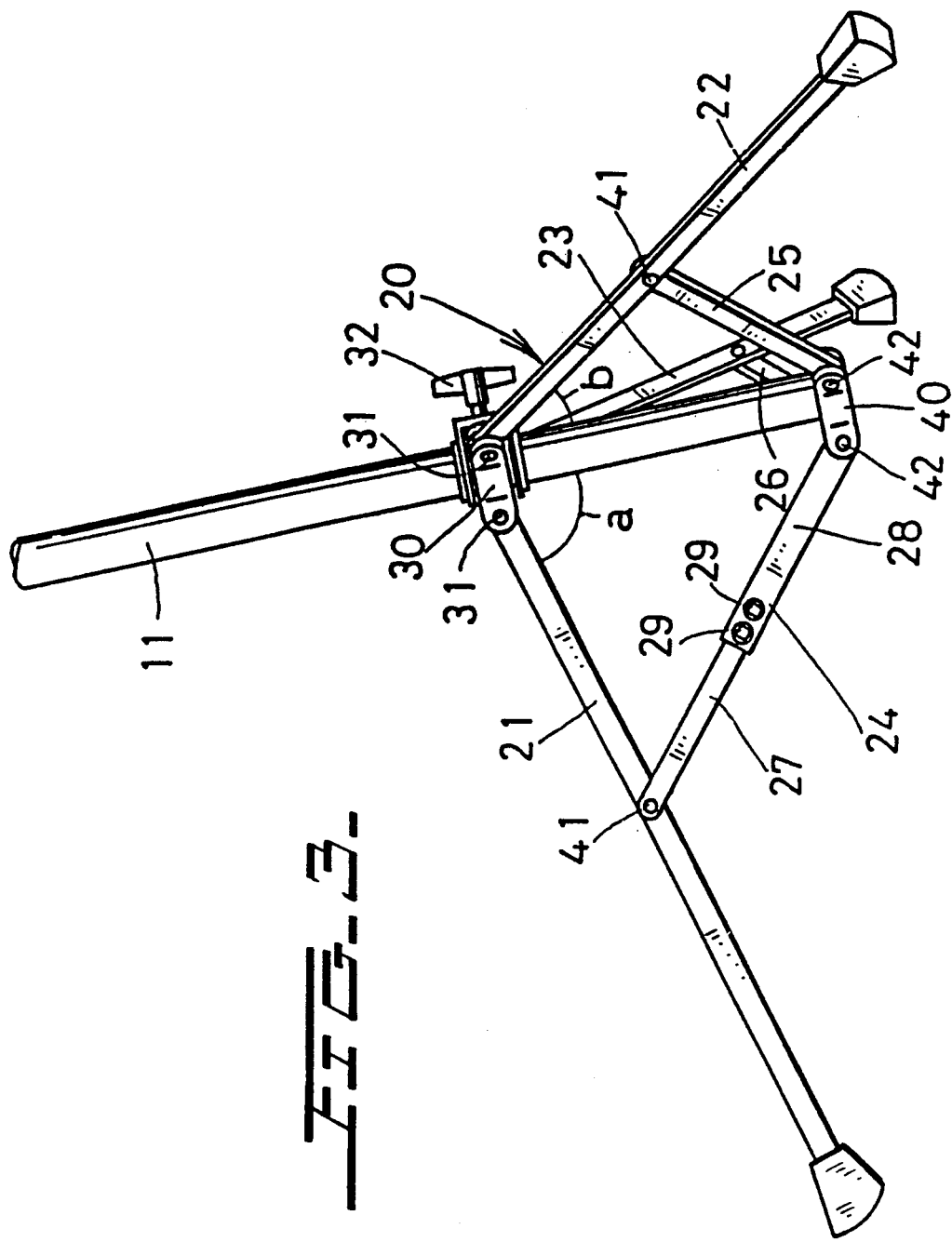

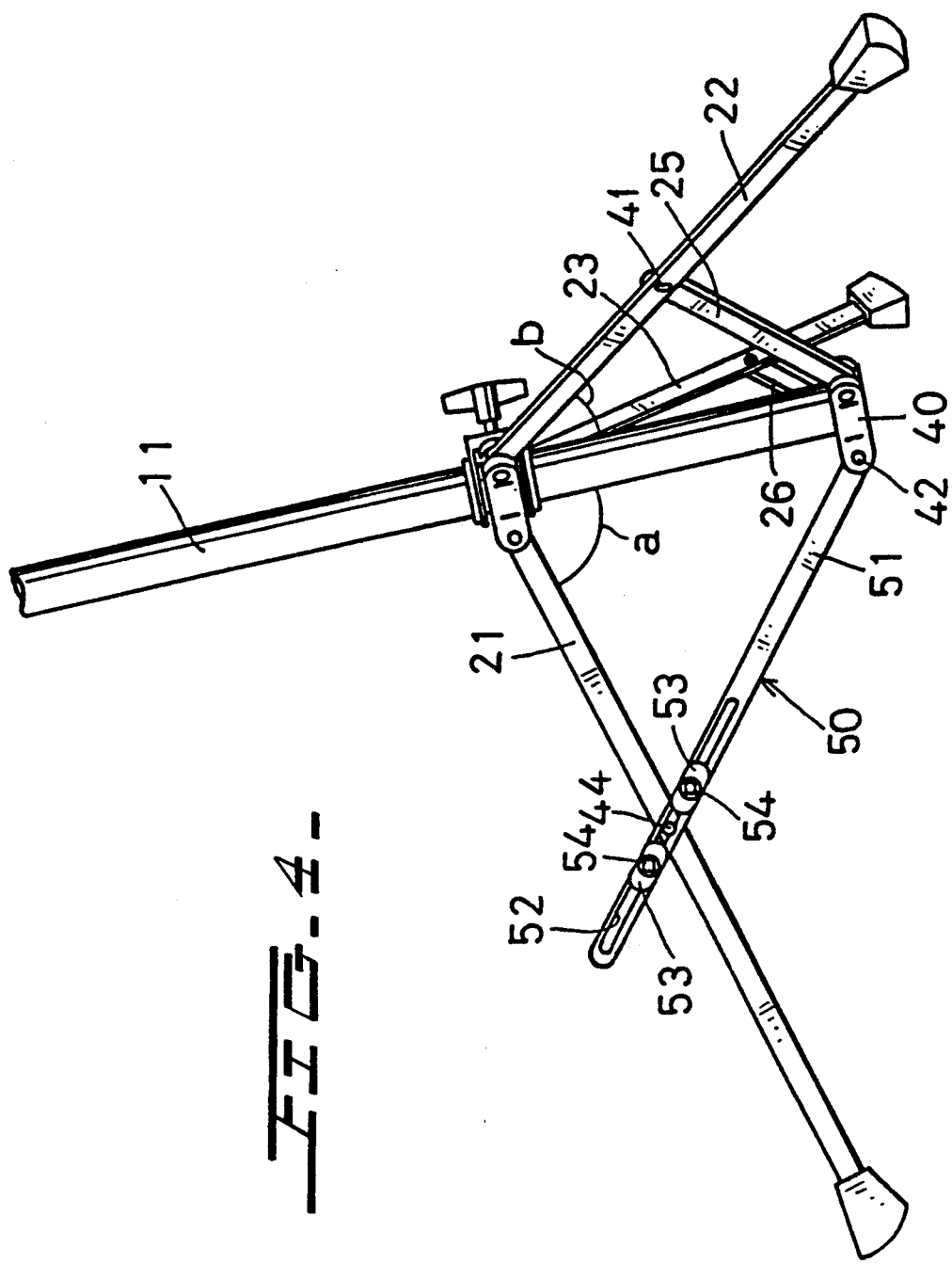

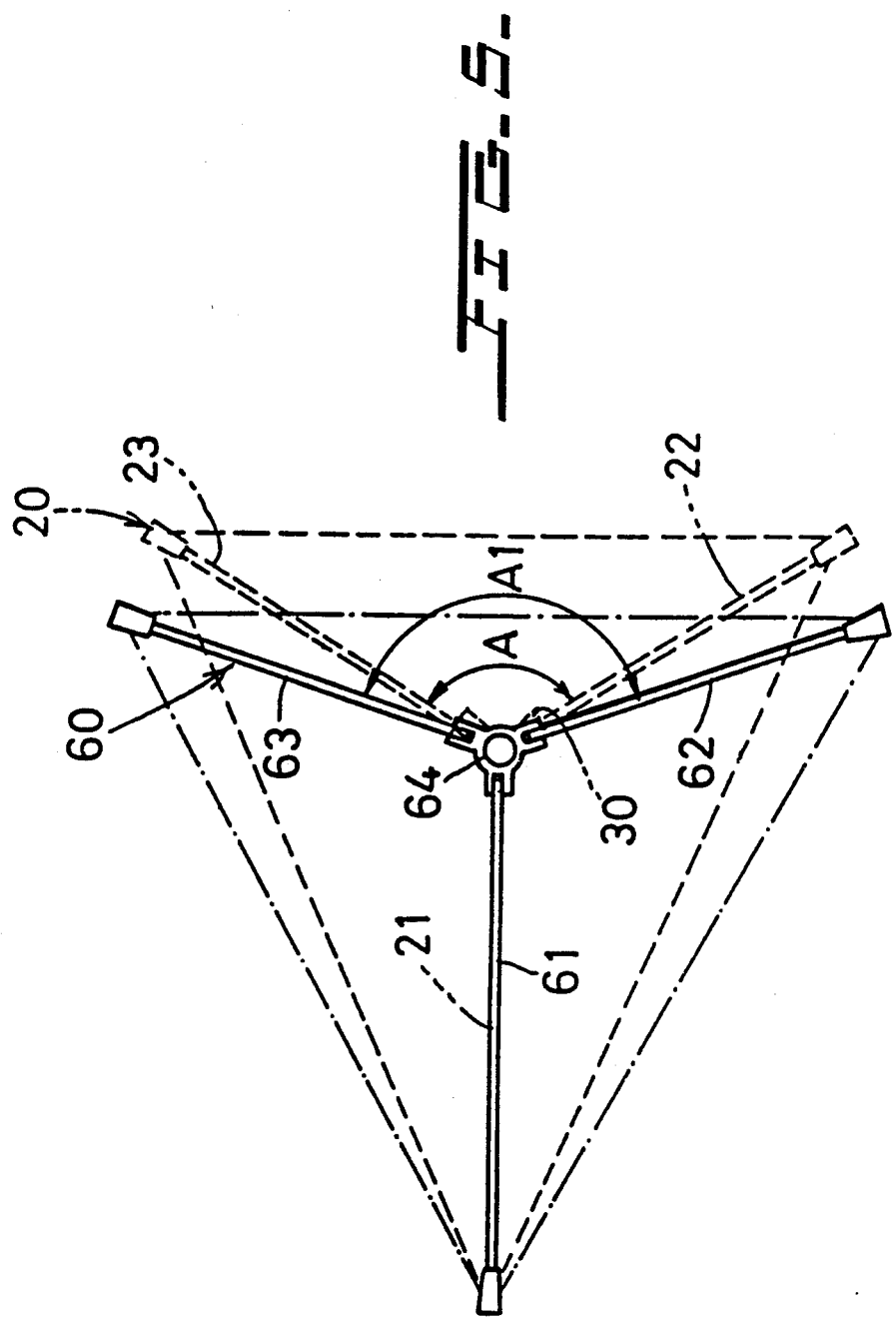

ADJUSTABLY TILTABLE TRIPOD STAND

This is a continuation of application Ser. No. 339,009, filed on Apr. 17, 1989, now abandoned.

BACKGROUND OF THE INVENTION

The present invention relates to a tripod stand, particularly suited for musical instruments, wherein the stand has a main post and a tripod leg structure supporting the main post.

The tripod structure is collapsible, wherein the legs of the stand may be folded inward toward the main post and may be extended, folded or tilted outward, to form a tripod or three leg support structure.

Conventional tripod stands, e.g. for supporting musical instruments or other devices, include a main post and three legs supporting the post. A sliding structure is provided at the main post to enable the three legs to be folded outward from the main post to a supporting position and inward toward the main post to a storage or carrying position. The sliding structure may comprise an upper holding member slidable along the main post. The upper end of each leg of the tripod stand is journaled or hingedly connected to the upper holding member. In such cases, the outer end of a respective articulated arm is journaled or hingedly connected along each leg, generally approximately at the middle of the leg and usually at the same distance along each leg from the upper holding member. A typically stationary, non-slidable lower holding member is provided on the main post below the upper holding member. The other, inner end of each articulated arm is journaled or hingedly connected to the stationary lower holding member. The above described movement of the tripod legs from the outward supporting to the inward storage positions can be achieved by the lower holding member being slidable along the main post while the upper holding member is stationary. With these types of connection for the legs and the articulated arms of the stand, the sliding of the slidable holding member, whether it is the upper or lower member, along the main post determines the angles, measured through the main post, at which the legs are separated from each other and from the main post. In addition, those tilt angles or spacings of the legs from the main post are identical, causing the bottom ends of the legs to define an equilateral triangle.

However, where it is desired to hold a musical instrument such as a specific drum or cymbal, or another device, such as a microphone, extending in one direction and thus off the center of the stand, e.g. in close proximity to a performer, variations in the structure of the tripod stand have been required. Additional supports have been required on the main post to provide outriggers or booms for carrying the off center instrument or device. This changes the center of gravity of the entire tripod stand making it unstable, and the stand may fall or lean into other devices.

In the invention, the tripod structure is arranged so that the main post can be tilted from an upright position to provide the type of support usually provided by an outrigger, to bring the supported particular musical instrument or device into alignment with other instruments or devices or into desired proximity to the user. For example, such tilting of the main post is known to be accomplished by a particular arrangement of or connection to one of the legs of the tripod, to permit one of the legs to be tilted outwardly from the main post to a different extent or angle than the other legs. In another invention by the applicant hereof, the angle of incline of one leg is adjusted with respect to that of the other legs by moving either the upper end of the one leg or the end of its articulated arm along the main post with respect to the corresponding part of the other legs.

The present invention is related to another invention for a tripod stand made by the present applicant. The other invention relates to a tripod stand for supporting a vertical main post. The legs of the tripod stand are connected at their upper ends to a vertically slidable upper holding member which may be adjustable along the vertical main post of the tripod stand. Each leg is connected to a respective articulated arm generally at the center of the leg. The articulated arms are also connected at the main post. Adjustment of the upper holding member adjusts the spread of the legs. One of the articulated arms is of a different length than the other two articulated arms, and is connected to its leg higher up toward the top of that leg, than are the other two articulated arms. When the tripod legs are opened outward for supporting the stand, the one leg is caused to extend further out from the main post than the other two legs, shifting the center of gravity of the stand toward that one leg, thereby providing a support for any overhanging element on that side of the stand. The articulated arms are all of fixed lengths, preselected at manufacture of the stand.

SUMMARY OF THE PRESENT INVENTION

The primary object of the present invention is the provision of a tripod stand having the function of desirably tilting the main post.

Another object of the invention is to tilt the main post of the stand by tilting one leg of the stand with respect to the other two legs.

A further object of the invention is to provide a stand capable of a multiplicity of functions in a very simple structure, wherein the stand is economical and very durable In the tripod stand of the invention, all of the legs are of the same length. The upper portion of each leg is held by an upper holding member which is slidably adjustable along the main post. One end of a respective articulated arm is journaled to each leg between the ends of the leg and preferably generally at the middle part of the leg. All three articulated arms are preferably attached to their legs at the same distance down from the upper holding member. The other end of each articulated arm is journaled to the main post below the upper holding member, generally at the lower end of the main post.

According to the invention, one of the three articulated arms is adjustable in length between the journal connection to the main post and the journal connection to the respective leg, so that it may be made longer than the other two articulated arms for tilting the main post of the stand or may be made the same length as the other two legs for holding the main post of the stand upright. Such adjustment are made by the performer or user of the stand. Various techniques of length adjustability may be selected, including making the arm telescopable, providing a slidable journal of the arm on either the leg or the main post, and the like. Preferably, the minimum adjusted length of the one articulated arm is the length of the other two articulated arms, which not only supports the main post upright, but permits the legs to be folded in to close the stand. When the legs are folded inward toward the main post into the closed condition, the connections to the legs described do not affect the legs. Of course, if the legs are to be folded inward, and if the one articulated arm had been extended, it must be reduced in length to the length of the other two arms. When the legs are moved outward to the supporting position, the described connections and the elongated length of the one articulated arm makes the angle of separation between the one leg and the main post greater than the angles of separation between the main post and each of the other two legs.

With the legs in the supporting position, and without the one leg being tilted outwardly relative to the other legs, the bottom ends of the legs define an equilateral triangle on the ground. On the other hand, with the one leg tilted at a different angle than the other legs, the bottom ends of the legs define an isosceles triangle on the ground. This also tilts the main post toward the one leg which is further outward than the other two legs and shifts the center of gravity of the stand toward the one leg and provides a more stable support for an instrument or device that is held on the stand spaced from the main post generally in the direction toward the one leg. The one leg connected to the longer articulated member extends outwardly further and braces the main post which has been tilted.

In a second embodiment of the present invention, with the legs in the supporting position and the one articulated arm extended in length, the one leg is again tilted further outward from the main post than the other legs by the longer articulated arm. In the first embodiment, the angles between adjacent legs at the upper holding member around the main post had been equal. In the second embodiment, the angle around the main post between the two less outwardly tilted legs, which angle is opposite the more outwardly tilted leg, is greater than the angles between the more outwardly tilted leg and each of the two other less tilted legs. The shifting of the two other legs toward the further outwardly tilted leg tends to make the triangle defined by the bottom ends of the legs more equilateral in shape than the triangle defined by the bottom ends of the legs in the first embodiment. This makes the stand more stable against laterally directed forces.

BRIEF DESCRIPTION OF THE DRAWINGS

The foregoing and many other objects and features of the present invention will become apparent in the following description and drawings in which:

FIG. 1 is a side elevational view of a tripod stand with adjustable legs and embodying the present invention.

FIG. 2 is a side elevational view of the stand with its legs folded for transport.

FIG. 3 is a view of the legs of the stand showing the first embodiment of the invention for tilting the main post of the stand.

FIG. 4 is a view of the legs showing the second embodiment of the invention.

FIG. 5 is a top plan view of an alternate embodiment of a tripod stand of the invention, shown in solid lines, overlaid on the first embodiment, shown in broken lines.

DESCRIPTION OF THE PREFERRED EMBODIMENTS

The tripod stand 10, for musical instruments or other objects, in FIG. 1, comprises a main post 11 and a three leg tripod part 20 located at the lower end of the main post 11. The main post 11 may be provided with any desired adjustable elongation or extension, not illustrated, and any connection or holder for engaging a particular musical instrument or another device, such as a microphone.

As can be better understood from FIG. 3, the tripod section 20 includes the three legs 21, 22 and 23 and the articulated arms 24, 25 and 26, which are each hingedly connected or journaled at respective hinge pins 41 to the respective legs 21, 22 and 23 at a location along each leg intermediate its ends, preferably at its midpoint between the upper and bottom ends of the leg.

An upper, leg holding member 30 is slidable along the main post 11 and may be set at any desired position along the main post 11 by the set screw 32. The upper end of each leg 21, 22 and 23 is also hingedly, pivotally journaled at respective hinge pins 31 to the upper holding member 30.

A lower holding member 40 is placed on the main post, spaced below the upper holding member 30, and is preferably at the bottom end of the main post 11. The lower end of each articulated arm 24, 25 and 26 is hingedly, pivotally journaled on the lower holding member 40 by a respective hinge pin 42.

In the embodiment of FIGS. 1-3, one of the three articulated arms, arm 24 for the leg 21, is adjustable in length while the other articulated arms preferably are not adjustable in length. The arm 24 is comprised of the telescopable parts 27 and 28 so that the total length of the arm 24 can be linearly adjustable. The tubular main part 28 is attached to the lower holding member 40 and the adjusting part 27, which slides inside the tubular part 28, is journaled to the leg 21. FIG. 2 shows how the arm 24 is constructed so that the tripod part 28 can be folded.

Adjusting the extension of the articulated arm 24 is done by sliding the adjusting part 27 along the tubular part 28 to achieve the desired length of the arm 24. Then the screws 29 in FIG. 3 are tightened to fix the set length. This provides a fine adjustment of the angle of tilt of the main post 11. Primarily, the angle of tilt of the main post 11 is determined by the position of the upper holding member 30.

The greater length of the one articulated arm 24 tends to tilt the leg 21 outwardly from main post 11 further than the legs 22, 23 when the legs are in their outward supporting positions of FIGS. 1 and 3.

The arm 24 has a maximum length extension as permitted by the combined lengths of its parts 27 and 28. Its preferable minimum length with its parts telescoped inward is the same length as the other articulated arms 25 and 26. At that length for arm 24, all legs 21, 22, 23 tilt out to the same extent and the main post is held straight. Furthermore, that shortened length of the arm 24 is usually needed to fold the legs to the main post 11, as in FIG. 2, because all arms are journaled at the same heights along their respective legs.

FIG. 3 illustrates a tilted arrangement for the stand 10. For the elongated articulated arm 24, the open angle (a), measured from the main post 11, of the respective leg 21 is larger than the open angle (b), also measured from the main post, of the other two legs 22 and 23. The tilt angle of the main post 11 from vertical upright is determined by the magnitude of this angular difference. As the upper holding member 30 is slid downward, the difference between the open angles (a) and (b) of the legs gradually increases, and the main post 11 tilts toward the leg 21 which is attached to the longer articulated arm 24. The adjustability of the length of the arm 24 enables the spread of the legs 21, 22, 23, that is their angles (a) and (b), to be set for best support and to also achieve good tilt support through a particular setting angle (a) by adjusting the length of the arm 24.

The equivalent function to that performed by the adjustable articulated arm 24 may be achieved with the articulated arm 50 shown in FIG. 4. The arm 50 has its main body 51 longer than the length of the other articulated arms, so that arm 50 can be adjustable in length. The inner lower end of the arm 50 is journaled to the lower holding member by hinge pin 42. It includes an elongate slot 52 which slidably receives the guide and pivot pin 44 on the respective leg 21. Regardless of where the pin 44 is disposed along the slot 52, that will be the upper or outer journal for the arm 51. The arm 51 is slid over the pin 44 for adjusting the effective or active length of the articulated arm 51.

A pair of stop members 53 are disposed in the slot 52, and the stop members bracket the pin 44 between them. Once the desired active length of arm 51 is selected, the stop members 53 are moved in the slot to hold to the pin 44 at the desired length of the arm 51. Then the stop members are set in position by the set screws 54. The effective or active length of the leg 51 is then the actual length between the two elements 42 and 44, as fixed by the stop members 53.

The length of and the ends of the slot 52 at least permits the arm 50 to be made short enough to have the same effective length as the other articulated arms of the stand and long enough to permit the maximum useful tilt of the leg 21 and therefore of the main post 11. With the arms 50, 25 and 26 of equal effective length, the main post is upright, not tilted.

Both of the embodiments of FIGS. 3 and 4 must be foldable closed, as in FIG. 2. For this purpose, the leg 24 and the leg 50, whichever is used, should be telescoped smaller or shifted along its slot 52 to the length of the other two arms, since any other length would interfere with uniform movement together of all the legs.

FIG. 5 shows a modified embodiment of a tripod stand 60 in solid lines overlaid in the drawing on the first embodiment 20 in broken lines. The broken lines show the top view of the three legged part 20 of the stand 10 that is shown in FIGS. 1, 2 and 3. The installation angle between each pair of the legs 21, 22 and 23 around the upper holding member 30, measured around the main post, is ordinarily fixed at the angle A of 120°, three equal angles around the main post 11. With the articulated arm 24, which is attached on the leg 21, extended in length, the main post 11 tilts toward the leg 21, while the angles A remain equal.

The three legged part 60 in the modified, solid line embodiment of FIG. 5 includes the legs 61, 62 and 63 which are arranged at fixed preset installation angles around the main post 11. The installation angle $A_1$ around the upper holding member 64 between the legs 62 and 63, which legs do not have respective long articulated arms, like 24, is made slightly larger than the two other installation angles between legs 61, 62 and legs 61, 63, so that angle $A_1$ is larger than 120°.

Because the legs 62 and 63 of stand part 60 have been moved toward leg 61, as compared with legs 22 and 23 of stand part 20, the triangle formed at the bottom ends of the legs 61, 62, 63 defines nearly an equilateral triangle. The triangle formed by the bottom ends of the legs 21, 22, 23 when the main post 11 of the stand 10 is tilted is an isosceles triangle wherein the two sides of the stand that extend generally along the tilting direction are longer than the side of the stand opposite the more tilted leg 21. Accordingly, the stand part 60 better resists any force that is applied from either side of the leg 61, which has the long articulated arm, as compared with a force applied from either side of leg 21 of part 20, thereby making it possible to obtain even greater stability with the second embodiment.

The structure of the present invention using the longer articulated arm 24 or 50 makes it possible to hold an instrument or other device without requiring a special boom or part for the same. The center of gravity of the stand can be set, or by tilting the legs 21, 61 reset, at a position to improve the stability of the stand. When the main post 11 is tilted, it will still have adequate support. The invention may avoid need for a boom or an outrigger to support an instrument, device, etc., because the longer articulated arm 24 and leg provide effectively the same result, without an increased number of parts, which achieves both economy and stability.

The invention enables tilting of the main post 11 to a desired angle from upright by a simple structure and without use of complex tools or need for special booms, outriggers or the like supports for any device supported with this stand. Also, the shifting of the one leg of the stand moves the center of gravity of the stand closer to the then actual center of the adjusted stand, improving its stability.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A tiltable tripod stand comprising:
 a main post;
 three tripod legs, the legs having respective upper ends; a holding member journaled to the upper ends of the legs and movable along the main post for moving the upper ends of the legs along the main post;
 the legs having lower ends for resting on a surface on which the tripod stand is supported;
 a respective articulated arm hingedly journaled to each leg intermediate the ends of the leg and also hingedly journaled to the main post, wherein movement of the upper ends of the legs with respect to the main post, through the articulated arms, selectively folds the legs together to close the stand and opens the legs apart to a supporting condition by forming the lower ends of the legs into a triangle which supports the tripod stand;
 one of the articulated arms being connected to one of the legs and the one arm being adjustable in its length between the respective one leg thereof and the main post, selectively enabling the one articulated arm to have a different length than the other two articulated arms; the other two arms having no length adjusting means, whereby the respective lengths of the other two articulated arms between the respective legs and the main post are fixed and non-adjustable; with the legs in the supporting condition, the length of the one articulated arm is adjustable in length to cause the tilt angle, with respect to the main post, of the one leg connected to the one articulated arm to be adjustable with respect to the tilt angles with respect to the main post of the other two legs connected to the other two articulated arms, enabling the tilting of the main post generally toward one of the legs.

2. The tiltable tripod stand of claim 1, wherein the one articulated arm is adjustable over a range of lengths including the same length as the other articulated arms and including a greater length than the length of the other articulated arms.

3. The tiltable tripod stand of claim 1, wherein the articulated arms are each journaled to their respective legs at the same distance spaced from the upper ends of the legs.

4. The tiltable tripod stand of claim 3, wherein the legs are of the same length.

5. The tiltable tripod stand of claim 4, wherein the one articulated arm is adjustable over a range of lengths including the same length as the other articulated arms and including a greater length than the length of the other articulated arms.

6. The tiltable tripod stand of claim 5, wherein the legs are connected to the main post around the holding member at locations such that with one of the legs more tilted than the other legs, the lower ends of the legs define an isosceles triangle, with the one leg being further out from the main post than the other two legs.

7. The tiltable tripod stand of claim 5, wherein the angle at the upper holding member around the main post between every two legs is 120°.

8. The tiltable tripod stand of claim 5, wherein the angle at the upper holding member around the main post between the two legs opposite the one leg is greater than the angle between the one leg and each of the other two legs.

9. The tiltable tripod stand of claim 8, wherein the lower ends of the legs define generally an equilateral triangle, variable slightly due to the selected angle of tilt of the main post.

10. The tiltable tripod stand of claim 5, wherein the one articulated arm is adjustable by being a telescopable arm between the journaled ends thereof.

11. The tiltable tripod stand of claim 5, wherein the one articulated arm is adjustable by one of its journal connections being a slidable connection past which the one arm is slidable for adjusting the location of the one journal connection along the length of the one arm.

12. The tiltable tripod stand of claim 5, wherein the one articulated arm is adjustable by its journal connection to the one leg being a slidable connection past which the one arm is slidable for adjusting the location of the journal connection of the one arm to the one leg along the length of the one arm.

13. The tiltable tripod stand of claim 12, wherein the slidable connection comprises an elongate slot in the one arm which slides over the journal connection for the one arm, and means for selectively positioning the arm over the journal connection.

14. The tiltable tripod stand of claim 13, wherein the means for selectively positioning comprises an adjustable position stopper in the slot for engaging the journal connection.

15. The tiltable tripod stand of claim 1, wherein the one articulated arm is adjustable by being a telescopable arm between the journaled ends thereof.

16. The tiltable tripod stand of claim 1, wherein the one articulated arm is adjustable by one of its journal connections being a slidable connection past which the one arm is slidable for adjusting the location of the one journal connection along the length of the one arm.

17. The tiltable tripod stand of claim 1, wherein the one articulated arm is adjustable by its journal connection to the one leg being a slidable connection past which the one arm is slidable for adjusting the location of the journal connection of the one arm to the one leg along the length of the one arm.

18. The tiltable tripod stand of claim 1, wherein the angle at the upper holding member around the main post between every two legs is 120°.

19. The tiltable tripod stand of claim 1, wherein the angle at the upper holding member around the main post between the two legs opposite the one leg is greater than the angle between the one leg and each of the other two legs.

20. The tiltable tripod stand of claim 1, wherein the legs are of the same length.

21. A tiltable tripod stand comprising:

a main post;

three tripod legs, the legs having respective upper ends; a holding member journaled to the upper ends of the legs at the main post for supporting the upper ends of the legs at the main post;

the legs having lower ends for resting on a surface on which the tripod stand is supported;

a respective articulated arm hingedly journaled to each leg intermediate the ends of the leg and also hingedly journaled to the main post, wherein movement of at least one of either of the articulated arms and the legs with respect to the main post, through the articulated arms, selectively folds the legs together to close the stand and opens the legs apart to a supporting condition by forming the lower ends of the legs into a triangle which supports the tripod stand;

one of the articulated arms being connected to one of the legs and the one arm being adjustable in its length between the respective one leg thereof and the main post, selectively enabling the one articulated arm to have a different length than the other two articulated arms; the other two arms having no length adjusting means, whereby the respective lengths of the other two articulated arms between the respective legs and the main part are fixed and non-adjustable; with the legs in the supporting condition, the length of the one articulated arm is adjustable in length to cause the tilt angle, with respect to the main post, of the one leg connected to the one articulated arm to be adjustable with respect to the tilt angles with respect to the main post of the other two legs connected to the other two articulated arms, for enabling the tilting of the main post generally toward the one leg connected to the one articulated arm.

22. The tiltable tripod stand of claim 21, wherein the one articulated arm is adjustable over a range of lengths including the same length as the other articulated arms and including a greater length than the length of the other articulated arms.

23. The tiltable tripod stand of claim 22, wherein the articulated arms are each journaled to their respective legs at the same distance spaced from the upper ends of the legs and wherein the legs are of the same length.

24. The tiltable tripod stand of claim 23, wherein the legs are of the same length.

25. A tiltable tripod stand comprising:

a main post;

three tripod legs, the legs having respective upper ends; a holding member journaled to the upper ends of the legs at the main post for supporting the upper ends of the legs at the main post;

the legs having lower ends for resting on a surface on which the tripod stand is supported;

a respective articulated arm hingedly journaled to each leg intermediate the ends of the leg and also hingedly journaled to the main post, wherein movement of at least one of either of the articulated arms and the legs with respect to the main post, through the articulated arms, selectively folds the legs together to close the stand and opens the legs apart to a supporting condition by forming the lower ends of the legs into a triangle which supports the tripod stand;

one of the articulated arms being connected to one of the legs and the one arm being adjustable in its length between the respective one leg thereof and the main post, selectively enabling the one articulated arm to have a different length than the other two articulated arms; the other two arms having no length adjusting means, whereby the respective lengths of the other two articulated arms between the respective legs and the main post are fixed and nonadjustable; wherein the angle at the upper holding member around the main post between the two legs opposite the one leg is greater than the angle between the one leg and each of the other two legs; with the legs in the supporting condition, the length of the one articulated arm is adjustable in length to cause the tilt angle, with respect to the main post, of the one leg connected to the one articulated arm to be adjustable with respect to the tilt angles with respect to the main post of the other two legs connected to the other two articulated arms, for the tilting of the main post generally toward the one leg connected to the articulated arm.

26. The tiltable tripod stand of claim 25, wherein the lower ends of the legs define generally an equilateral triangle, variable slightly due to the selected angle of tilt of the main post.

* * * * *